US007179200B1

(12) United States Patent
Wu

(10) Patent No.: US 7,179,200 B1
(45) Date of Patent: Feb. 20, 2007

(54) WHEELCHAIR

(76) Inventor: David Wu, No. 35-1, Jih Hsin Street, Tu Cheng City, Taipei Hsien (TW)

( * ) Notice: Subject to any disclaimer, the term of this patent is extended or adjusted under 35 U.S.C. 154(b) by 8 days.

(21) Appl. No.: 11/195,711

(22) Filed: Aug. 3, 2005

(51) Int. Cl.
*A63B 21/00* (2006.01)
*A61H 3/00* (2006.01)
*B62M 1/00* (2006.01)

(52) U.S. Cl. ...................... 482/51; 280/87.041; 135/67

(58) Field of Classification Search .................. 482/51, 482/66–68, 904; D12/130; 135/65, 67; 280/87.05, 87.041
See application file for complete search history.

(56) References Cited

U.S. PATENT DOCUMENTS 4,907,794 A * 3/1990 Rose ........................... 482/68
D451,053 S * 11/2001 Hallgrimsson ............. D12/130
6,338,355 B1 * 1/2002 Cheng ......................... 135/67
6,481,730 B2 * 11/2002 Sung ....................... 280/87.05
6,877,519 B2 * 4/2005 Fink ............................ 135/67
7,001,313 B1 * 2/2006 Crnkovich ................... 482/68
7,040,637 B2 * 5/2006 Owens et al. .......... 280/87.021

* cited by examiner

*Primary Examiner*—Stephen R. Crow
(74) *Attorney, Agent, or Firm*—Troxell Law Office, PLLC

(57) ABSTRACT

A wheelchair is disclosed having two adjustment structures for allowing adjustment of the elevation of two handlebars relative to the two parallel vertical main frame bars thereof, each adjustment structure including a holder block fixedly provided at the top of the respective vertical main frame bar to accommodate the respective handlebar, a holding down block movably mounted in the holder block, and a locking lever pivoted to the holder block for moving a locating rod into one of a vertically aligned series of locating holes at the respective handlebar and forcing the holding down block against the respective handlebar.

4 Claims, 10 Drawing Sheets

WHEELCHAIR

BACKGROUND AND SUMMARY OF THE INVENTION

The present invention relates to a wheelchair and more particularly, to such a wheelchair, which has adjustment structures for allowing adjustment of the elevation of the handlebars.

FIG. 1 shows a conventional wheelchair 8. According to this design, the wheelchair 8 comprises two handlebars 81, which have a respective bottom end 811 respectively inserted into the two parallel main frame bars 82, and two lock screws 83 respectively provided at the top ends of the two parallel main frame bars 82 for locking the respective handlebars 81. This handlebar locking design is not safe in use. If the lock screws 83 are not fastened tight, the handlebars 81 may fall from the main frame bars 82 accidentally, resulting in an accident. Further, the lock screws 83 wear quickly with use.

The present invention has been accomplished under the circumstances in view. According to one aspect of the present invention, the wheelchair comprises two adjustment structures for allowing adjustment of the elevation of two handlebars relative to the two parallel vertical main frame bars thereof. Each adjustment structure comprises a holder block fixedly provided at the top of the respective vertical main frame bar to accommodate the respective handlebar, a holding down block movably mounted in the holder block, and a locking lever pivoted to the holder block for moving a locating rod into one of a vertically aligned series of locating holes at the respective handlebar and forcing the holding down block against the respective handlebar. According to another aspect of the present invention, the handlebar elevation adjustment structures are simple. Simply by turning the locking lever forwards or backwards, the respective handlebar is locked to the respective vertical frame bar or unlocked from the respective vertical frame bar for adjustment.

DETAILED DESCRIPTION OF THE PREFERRED EMBODIMENT

Figure 1:
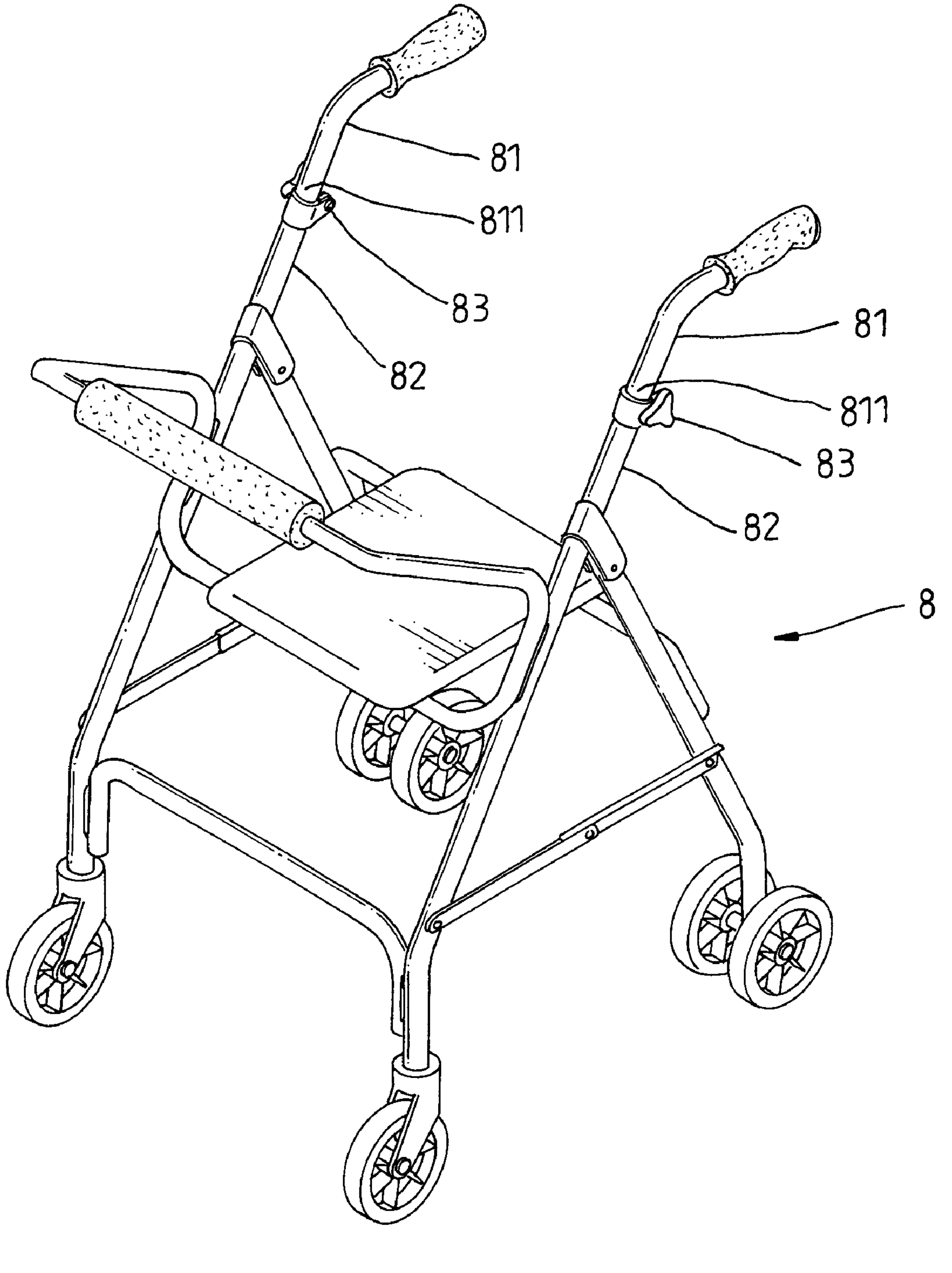
Fig.1 PRIOR ART
FIG. 1 is an elevational view of a wheelchair according to the prior art.
Figure 2:
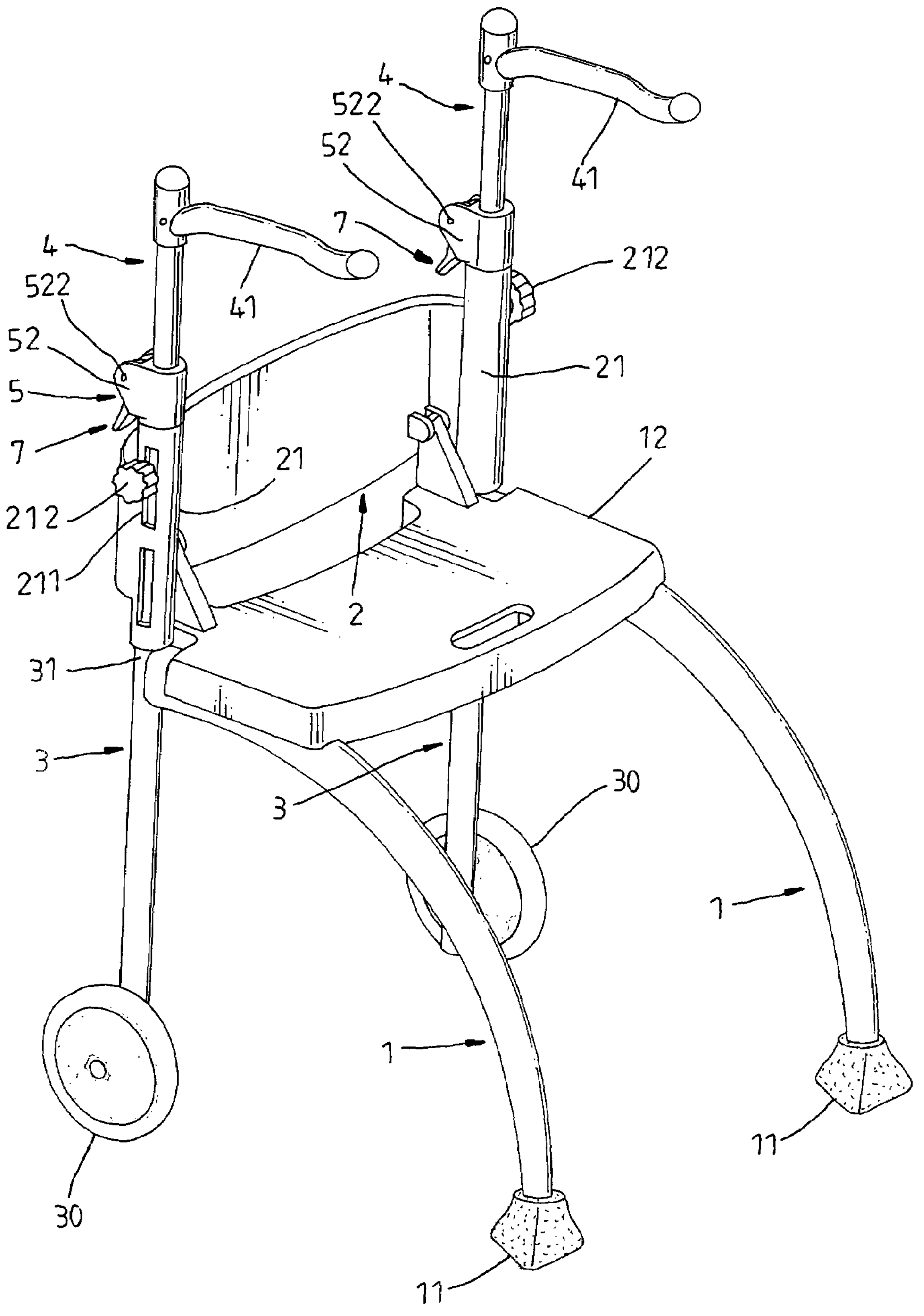
FIG. 2 is an elevational view of a wheelchair according to the present invention.
Figure 3:
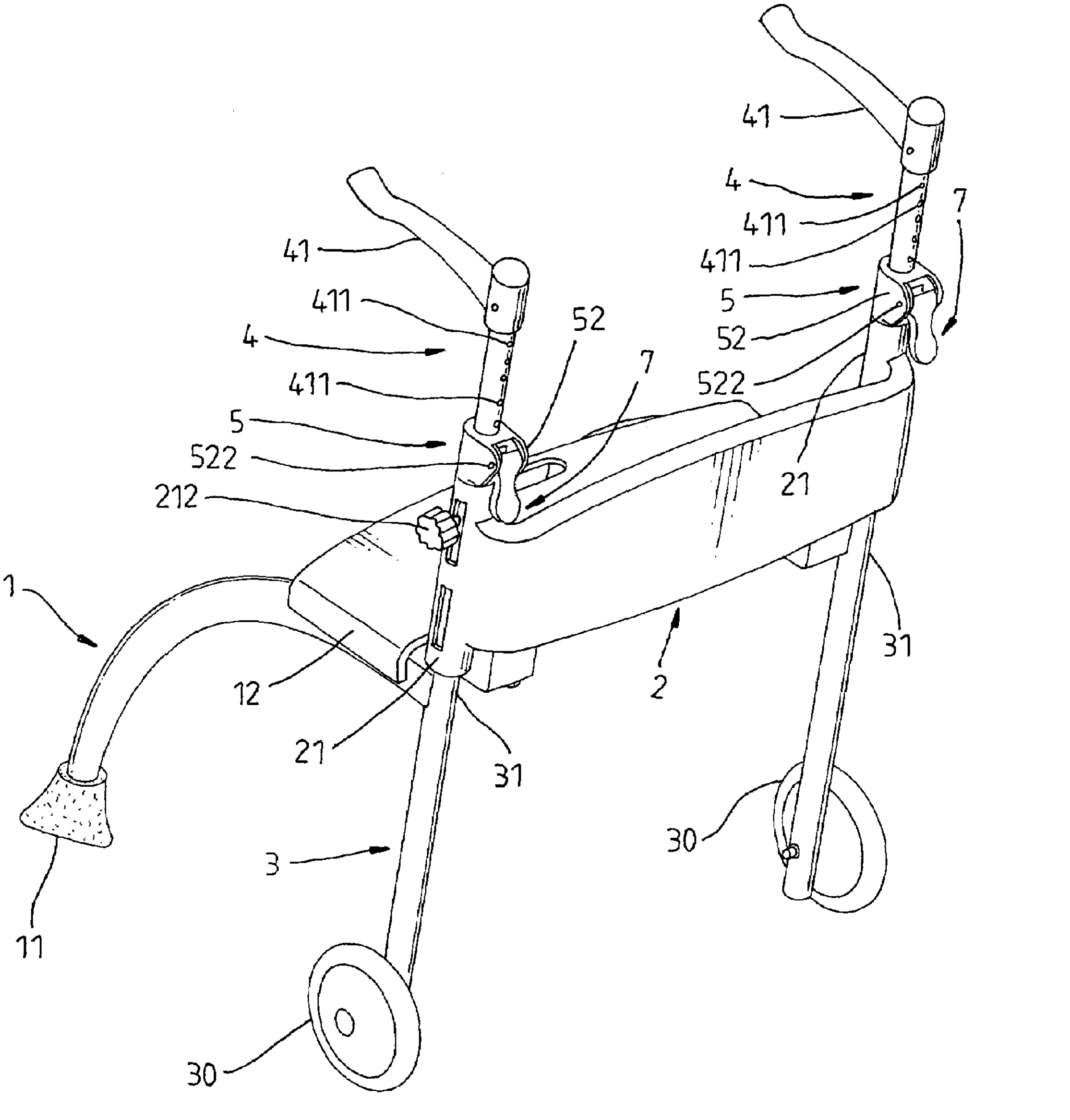
FIG. 3 corresponds to FIG. 2 when viewed from another angle.
Figure 4:
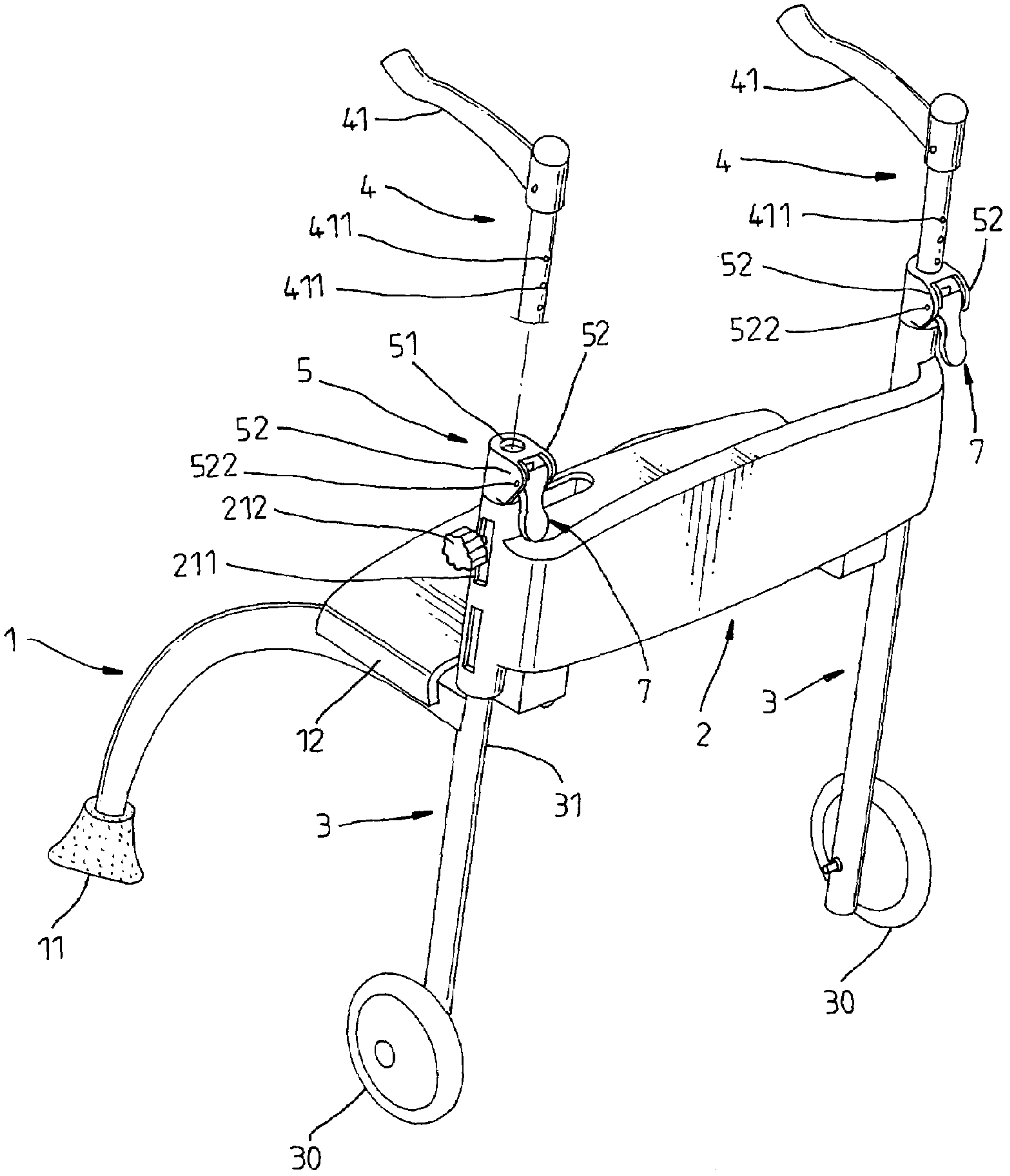
FIG. 4 is an exploded view of the wheelchair according to the present invention.
Figure 5:
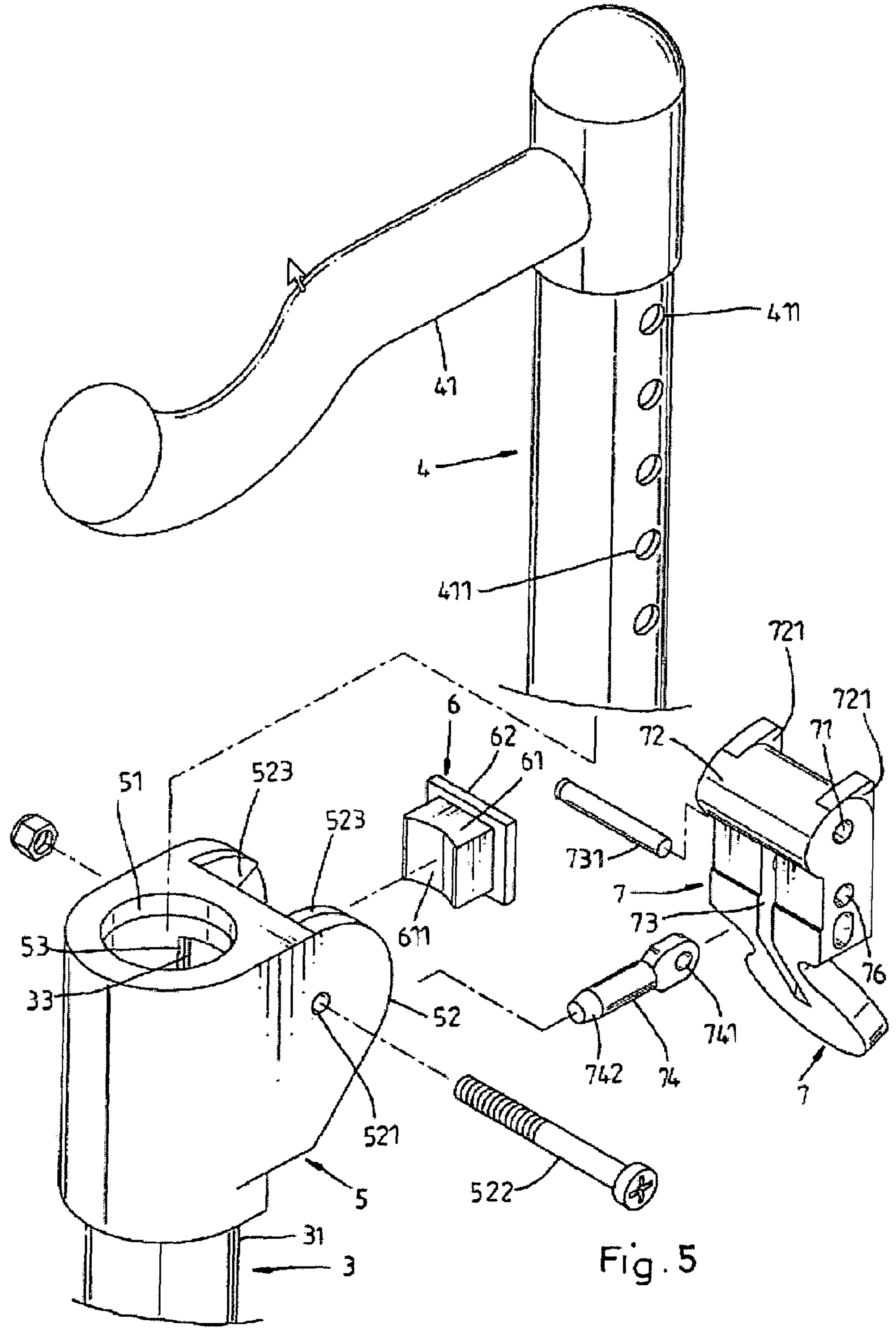
FIG. 5 is an exploded view in an enlarged scale of a part of the wheelchair according to the present invention.
Figure 6:
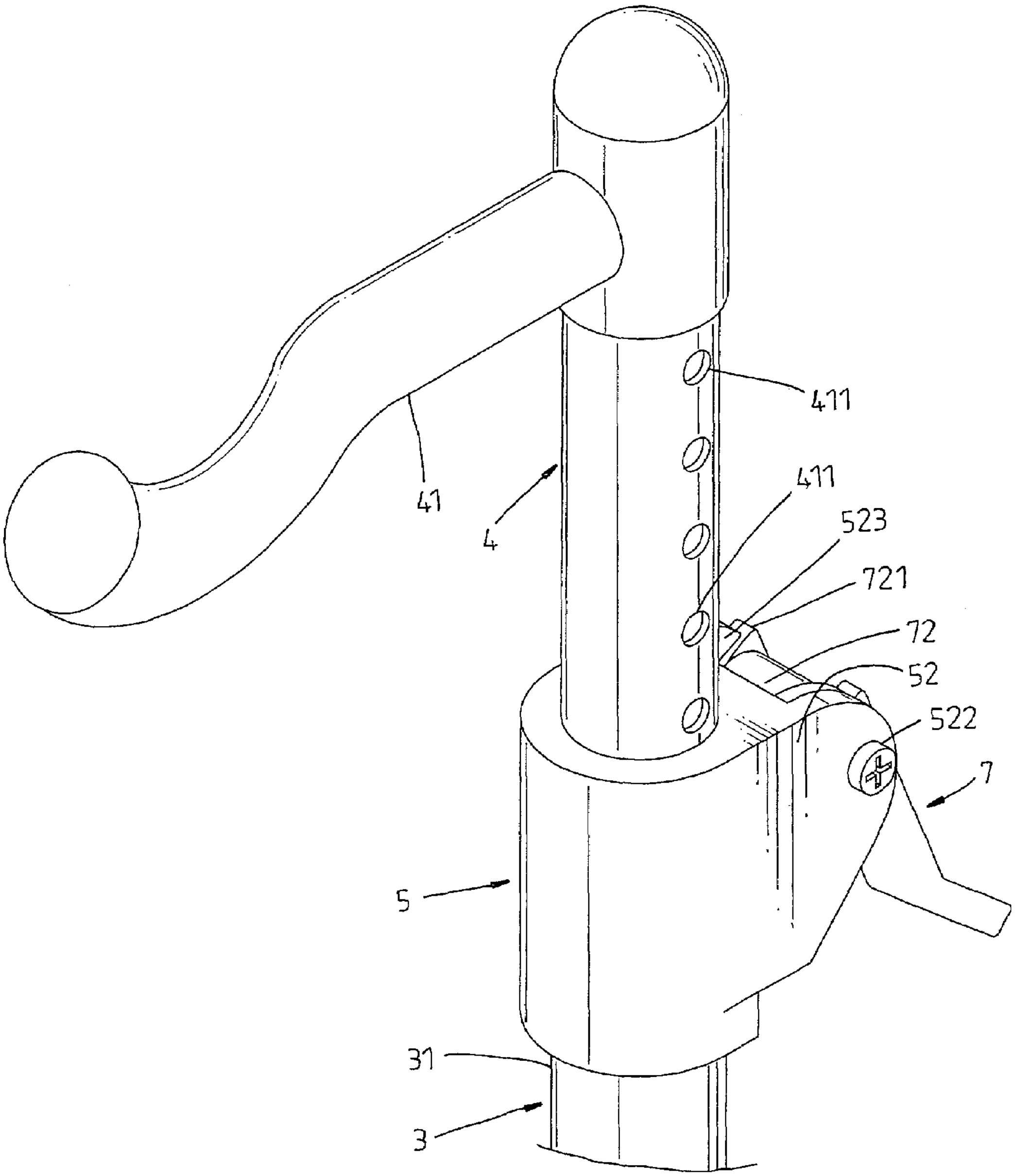
FIG. 6 is an elevational assembly view of FIG. 5.
Figure 7:
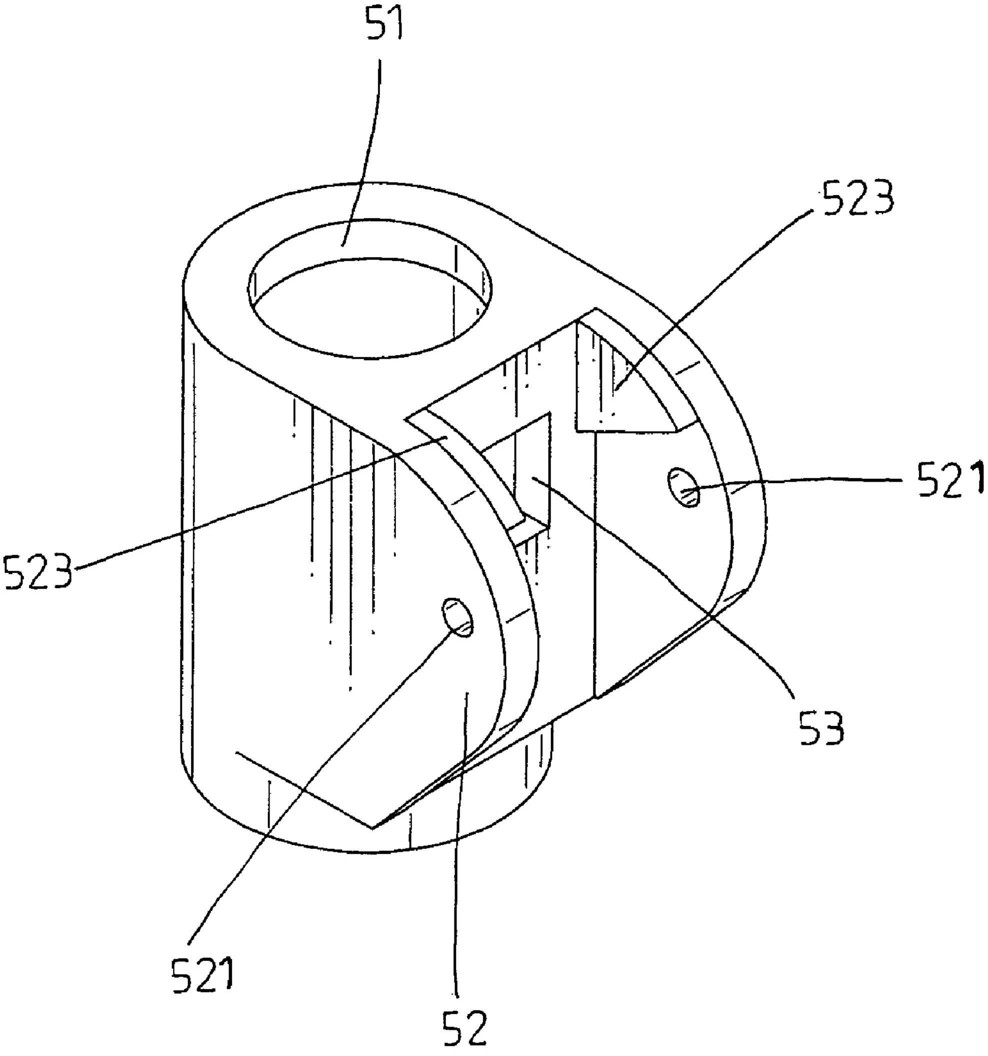
FIG. 7 is an elevational view in an enlarged scale of the holder block of the wheelchair according to the present invention.

Referring to FIGS. 2~10, a wheelchair is shown comprised of two side frame bars 1, a back frame 2, two vertical main frame bars 3, and two handlebars 4.

The side frame bars 1 are curved frame bars each having a top end respectively fixedly connected to the vertical main frame bars 3 and a bottom end fixedly mounted with a foot member 11. Further, a seat 12 is fixedly supported on the side frame bars 1 at the top in a substantially horizontal position.

The back frame 2 holds the two vertical main frame bars 3 in parallel, having two sleeves 21 fixedly provided at two opposite lateral sides thereof in vertical and respectively sleeved onto the vertical frame bars 3. Two lock screws 212 are respectively inserted through a respective longitudinal sliding slot 211 at each of the sleeves 21 and threaded into the vertical main frame bars 3 to lock the vertical main frame bars 3 to the back frame 2.

The two vertical main frame bars 3 each have a top end 31 respectively inserted into the sleeves 21 of the back frame 2 and locked thereto by the aforesaid lock screws 212 (see FIG. 2), a middle part respectively fixedly connected to the top end of each of the side frame bars 1, and a bottom end pivotally mounted with a respective wheel 30.

The two handlebars 4 are respectively connected to the top ends 31 of the vertical main frame bars 3, each having a grip 41 for the holding of the user's hands. Further, each handlebar 4 has a plurality of locating holes 411 arranged at different elevations and aligned in a line.

The wheelchair of the present invention further comprises an adjustment structure set between each vertical main frame bar 3 and the respective handlebar 4 for adjustment of the elevation of the respective handlebar 4. The adjustment structure is comprised of a holder block 5, a holding down block 6, and a locking lever 7 (see FIGS. 5 and 8).

Figure 8:
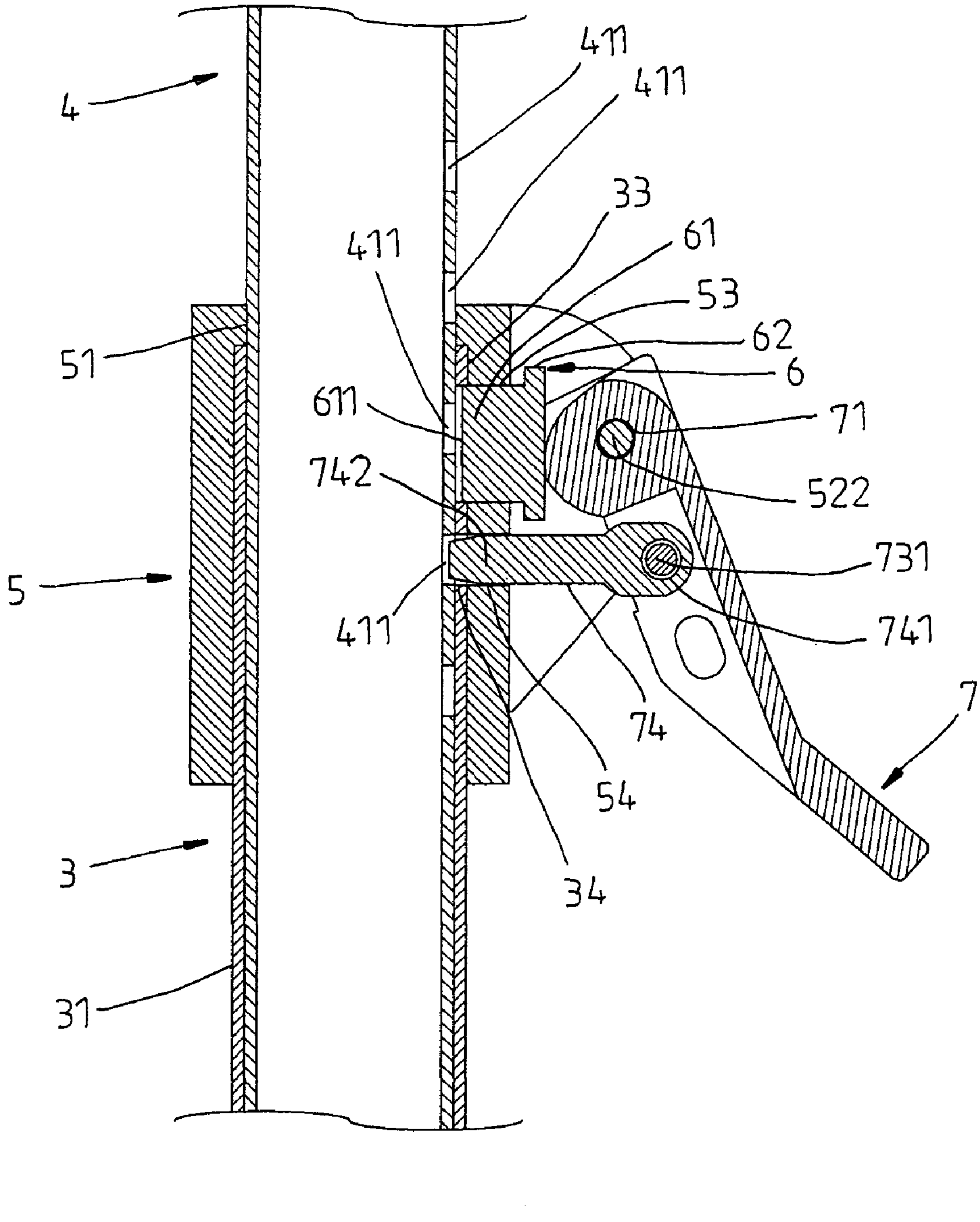
FIG. 8 is a longitudinal view in section in an enlarged scale of a part of the wheelchair according to the present invention, showing the unlocking status of the locking lever.

Further, each vertical main frame bar 3 has a longitudinal sliding slot 33 in the top end 31 at one side, and a transverse locating hole 34 formed in the top end 31 below the longitudinal sliding slot 33 (see FIG. 8). The holder block 5 is fixedly fastened to the top end 31 of the respective vertical main frame bar 3, comprising a vertical coupling hole 51, which receives the top end 31 of the respective vertical main frame bar 3, a transverse insertion slot 53 and a locating hole 54 disposed in communication with the vertical coupling hole 51 corresponding to the longitudinal sliding slot 33 and locating hole 34 of the respective vertical main frame bar 3 respectively (see FIG. 5), two parallel side lugs 52, each side lug 52 having a transversely extending pivot hole 521 for the connection of the locking lever 7, and two stop blocks 523 respectively formed integral with the side lugs 52 for stopping against a respective stop block 721 of the locking lever 7 to limit the turning angle of the locking lever 7 relative to the holder block 5 (see FIG. 5).

The holding down block 6 comprises a relatively smaller block body 61 and a relatively greater stop wall 62. The block body 61 is protruded from the front side of the stop wall 62 and inserted through the transverse insertion slot 53 of the holder block 5 and the longitudinal sliding slot 33 of the respective vertical main frame bar 3, having an inwardly curved front surface 611.

The locking lever 7 comprises a cam 72 transversely disposed at the top, a first pivot hole 71 axially extending through the cam 72 and pivotally connected between the pivot holes 521 of the side lugs 52 of the holder block 5 by a pivot bolt, two stop blocks 721 extending from the two distal ends of the cam 72 for stopping against the two stop blocks 523 of the holder block 5 to limit the turning-angle of the locking lever 7 relative to the holder block 5, a sliding groove 73 disposed at an inner side, a second pivot hole 76 transversely extending across the sliding groove 73, and a locating rod 74, which has an eyelet 741 disposed at one end inserted into the sliding groove 73 and pivotally connected to the second pivot hole 76 by a pivot pin 731 and a positioning tip 742 disposed at the other end and insertable through the locating hole 54 of the holder block 5 and the locating hole 34 of the respective vertical main frame bar 3 into one of the locating holes 411 of the respective handlebar 4 to lock the respective handlebar 4 to the respective vertical main frame bar 3 at the desired elevation.

Figure 9:
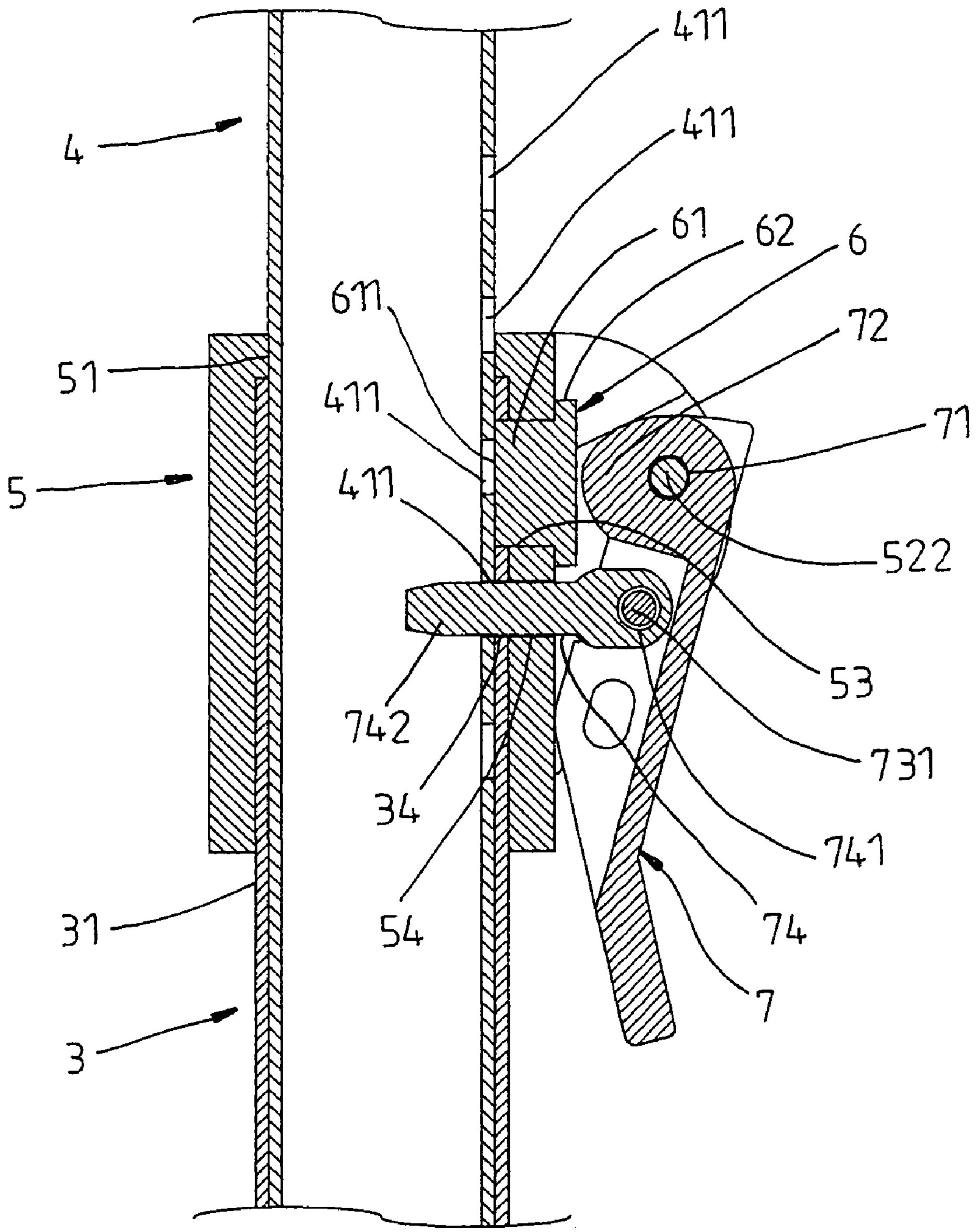
FIG. 9 is similar to FIG. 8 but showing the locking lever turned to the locked position.
Figure 10:
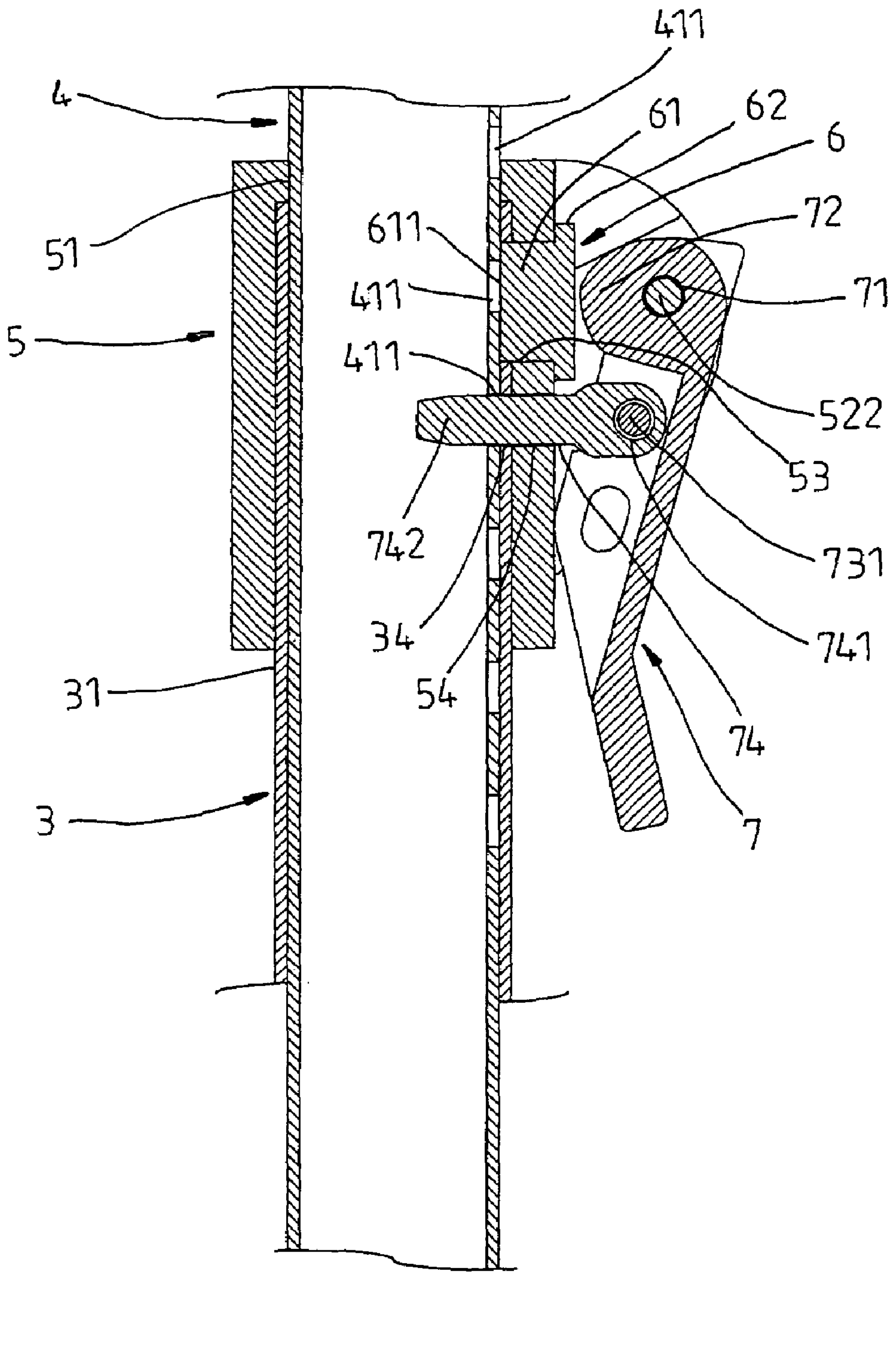
FIG. 10 is similar to FIG. 9 but showing the handlebar adjusted to another elevational position.

When turning the locking lever 7 toward the holder block 5, the positioning tip 742 of the locating rod 74 will be forced through the locating hole 54 of the holder block 5 and the locating hole 34 of the respective vertical main frame bar 3 into one of the locating holes 411 of the respective handlebar 4 (see FIG. 9). At this time, the cam 72 will be forced against the holding down block 6, causing the inwardly curved front surface 611 of the holding down block 6 to hold the handlebar 4 in the respective vertical main frame bar 3, and therefore the handlebar 4 is locked to the respective vertical main frame bar 3 at the desired elevation. On the contrary, when reversed the locking lever 7, the positioning tip 742 of the locating rod 74 is disengaged from the respective locating hole 411 of the respective handlebar 4, allowing the handlebar 4 to be moved vertically relative to the respective vertical main frame bar 3 to the desired elevation (see FIG. 8). After the handlebar 4 has been adjusted to the desired elevation, the locking lever 7 is turned forwards to move the positioning tip 742 of the locating rod 74 into the corresponding locating hole 411 of the respective handlebar 4 and to force the holding down block 6 against the respective handlebar 4 (see FIG. 11), thereby locking the handlebar 4 to the respective vertical main frame bar 3 again.

As indicated above, the invention has the following advantages:

1. The locking lever 7 is pivoted to the holder block 5 at the respective vertical main frame bar 3 to move the locating rod 74 through the locating hole 54 of the holder block 5 and the locating hole 34 of the respective vertical main frame bar 3 into the locating holes 4111 of the respective handlebar 4 and to simultaneously force the holding down block 6 against the respective handlebar 4, thereby locking the respective handlebar 4 to the respective vertical frame bar 3 positively.

2. The handlebar elevation adjustment structure is simple. Simply by turning the locking lever 7 forwards or backwards, the handlebar 4 is locked to the respective vertical frame bar 3 or unlocked from the respective vertical frame bar 3 for adjustment.

Although a particular embodiment of the invention has been described in detail for purposes of illustration, various modifications and enhancements may be made without departing from the spirit and scope of the invention.

The invention claimed is:

1. A wheelchair comprising:

two vertical main frame bars, said vertical main frame bars each having a top end, a bottom end, and a wheel pivotally provided at said bottom end;

a back frame connected between said vertical frame bars to hold said vertical frame bars in parallel;

two side frame bars respectively and fixedly extending from said vertical main frame bars, said side frame bars each having a bottom end fixedly mounted with a foot member;

a seat fixedly supported on said side frame bars at a top side;

two handlebars respectively connected to the top ends of said vertical main frame bars, said handlebars each having a plurality of locating holes arranged at different elevations and aligned in a line; and two adjustment structures respective set between said vertical main frame bars and said handlebars for locking said handlebars to said vertical main frame bars respectively;

wherein said vertical main frame bars are tubular frame bars each comprising a longitudinal sliding slot at the respective top end and a transverse locating hole below said longitudinal sliding slot; said adjustment structures each comprise:

a holder block fixedly fastened to the top end of the respective vertical main frame bar, said holder block comprising a vertical coupling hole, which receives the top end of the respective vertical main frame bar, a transverse insertion slot and a locating hole disposed in communication with said vertical coupling hole corresponding to the longitudinal sliding slot and locating hole of the respective vertical main frame bar respectively, two parallel side lugs, said side lugs each having a transversely extending pivot, and two stop blocks respectively formed integral with said side lugs at an inner side;

a holding down block for holding down the respective handlebar, said holding down block comprising a stop wall, and a block body protruding from said stop wall and inserted through the transverse insertion slot of said holder block and the longitudinal sliding slot of the respective vertical main frame bar; and a locking lever, said locking lever comprising a top cam for forcing said holding down block against the respective handlebar, a pivot hole axially extending through said cam and pivotally connected between the pivot holes of the side lugs of said holder block, a sliding groove disposed at an inner side, and a locating rod pivoted to a top end of said sliding groove and inserted through the locating hole of said holder block and the locating hole of the respective vertical main frame bar and movable in and out of one of the locating holes of the respective handlebar to lock/unlock the respective handlebar.

2. The wheelchair as claimed in claim 1, wherein said locking lever comprises a second pivot hole extending across the sliding groove thereof; said locating rod has an eyelet disposed at one end and inserted into the sliding groove of said locking lever and pivotally connected to said second pivot hole with a pivot pin.

3. The wheelchair as claimed in claim 1, wherein said locking lever comprises two stop blocks extending from two distal ends of said cam for stopping against the two stop blocks of said holder block to limit the turning angle of said locking lever relative to said holder block.

4. The wheelchair as claimed in claim 1, wherein said block body of said holding down block has an inwardly curved front surface fitting the periphery of the respective handlebar.

* * * * *